US011020753B2

(12) United States Patent
Nielsen (10) Patent No.: US 11,020,753 B2
(45) Date of Patent: Jun. 1, 2021

(54) APPARATUS AND METHOD FOR MONITORING AND CONTROLLING A CENTRIFUGAL

(71) Applicant: BJARNE CHRISTIAN NIELSEN HOLDING APS, Bevtoft (DK)

(72) Inventor: Bjarne Christian Nielsen, Bevtoft (DK)

(73) Assignee: BJARNE CHRISTIAN NIELSEN HOLDING APS, Bevtoft (DK)

(*) Notice: Subject to any disclaimer, the term of this patent is extended or adjusted under 35 U.S.C. 154(b) by 526 days.

(21) Appl. No.: 15/765,035

(22) PCT Filed: Feb. 19, 2016

(86) PCT No.: PCT/EP2016/053572
§ 371 (c)(1),
(2) Date: Mar. 30, 2018

(87) PCT Pub. No.: WO2017/054934
PCT Pub. Date: Apr. 6, 2017

(65) Prior Publication Data
US 2019/0046997 A1    Feb. 14, 2019

(30) Foreign Application Priority Data

Oct. 2, 2015   (EP) .................................. 15188183

(51) Int. Cl.
*B04B 11/04*    (2006.01)
*B04B 11/02*    (2006.01)
(Continued)

(52) U.S. Cl.
CPC ............ *B04B 11/043* (2013.01); *B04B 11/02* (2013.01); *B04B 11/04* (2013.01); *B04B 13/00* (2013.01);
(Continued)

(58) Field of Classification Search
CPC ....... B04B 11/043; B04B 11/04; B04B 11/02; B04B 13/00; B03B 5/32; G01N 2021/8411
(Continued)

(56) References Cited

U.S. PATENT DOCUMENTS 4,405,454 A * 9/1983 Hultsch .................. B01D 33/27
209/279
5,900,156 A * 5/1999 Zeigler .................. B01D 21/34
210/744
(Continued)

FOREIGN PATENT DOCUMENTS

AU    2009298228 A1    4/2010
AU    2010272474 A1    2/2012
(Continued)

OTHER PUBLICATIONS

European Search Report from EP Application No. EP 15 18 8183, dated Jan. 26, 2016.
(Continued)

*Primary Examiner* — Walter D. Griffin
*Assistant Examiner* — Shuyi S. Liu
(74) *Attorney, Agent, or Firm* — Workman Nydegger (57) ABSTRACT

The present invention relates to an integrated apparatus for monitoring the separation of the solid and liquid phases in a centrifugal by measuring at least one parameter of a filling material inside a centrifugal, the integrated apparatus comprising at least one light source for illuminating at least part of a surface of the filling material, and a light detector arrangement being a adapted to receive light reflected from the filling material. The present invention also relates to an associated method for monitoring and controlling separation of solid and liquid phases in a centrifugal.

20 Claims, 5 Drawing Sheets

(51) Int. Cl.
 *B04B 13/00* (2006.01)
 *G01N 21/84* (2006.01)
 *B03B 5/32* (2006.01)

(52) U.S. Cl.
 CPC ........ *B03B 5/32* (2013.01); *G01N 2021/8411* (2013.01)

(58) Field of Classification Search
 USPC ........... 494/6, 7, 10, 23, 29, 37, 42; 210/744
 See application file for complete search history.

(56) References Cited

U.S. PATENT DOCUMENTS

| | | | | |
|---|---|---|---|---|
| 2010/0059458 | A1* | 3/2010 | Hoffmann | B01D 21/0012 210/788 |
| 2012/0252651 | A1* | 10/2012 | Hoffmann | B01F 15/063 494/42 |

FOREIGN PATENT DOCUMENTS

| | | |
|---|---|---|
| AU | 2010272557 A1 | 2/2012 |
| DE | 3515915 A1 | 11/1986 |
| EP | 1475156 A2 | 11/2004 |
| EP | 2275207 A1 | 1/2011 |
| EP | 2277627 A1 | 1/2011 |
| GB | 1524726 A | 9/1978 |
| WO | 3904468 A1 | 5/1989 |
| WO | 9852629 A2 | 11/1998 |

OTHER PUBLICATIONS

International Preliminary Report on Patentability from PCT Application No. PCT/EP2016/053572, dated Jan. 4, 2018.
International Search Report from PCT Application No. PCT/EP2016/053572, dated Jun. 28, 2016.

\* cited by examiner

APPARATUS AND METHOD FOR MONITORING AND CONTROLLING A CENTRIFUGAL

FIELD OF THE INVENTION

The present invention relates to an integrated apparatus for monitoring and controlling a separation of solid and liquid phases in a centrifugal. The present invention further relates to a method for controlling a centrifugal in order to optimize the separation of solid and liquid phases.

BACKGROUND OF THE INVENTION

The environment inside a centrifugal, such as a centrifugal used for sugar production, may be harsh and therefore incompatible for electronic devices in general. To avoid the harsh environment inside the centrifugal, measurements on a centrifugal's content, or at least the electronic devices performing the measurements, are typically arranged outside the centrifugal.

An example is given in WO 89/04468 where an apparatus for colour control of for example sugar on a conveyer belt is depicted. The apparatus suggested in WO 89/04468 comprises two parts—one part containing the light source and another part containing the detectors, the latter being connected to a control unit. The discrete nature of the apparatus suggested in WO 89/04468 makes it unsuitable for being positioned inside a centrifugal.

Also, it is a disadvantage of the apparatus suggested in WO 89/04468 that the light source part and the detector part are not combinable due to electromagnetic interference problems being generated by the light source part of the apparatus.

Another approach has been suggested in DE 3 515 915 A1. Also in this approach the light source and the detector are separated, i.e. they do not form part of the same integrated device. Contrary to the approach suggested in WO 89/04468 the light source and the detector of DE 3 515 915 A1 may be positioned inside a centrifugal.

It may be seen as an object of embodiments of the present invention to provide an integrated and robust apparatus for monitoring and controlling the separation of solid and liquid phases in a centrifugal.

It may be seen as a further object of embodiments of the present invention to provide an integrated apparatus for measuring colour, thickness and/or instability of a filling material inside a centrifugal.

DESCRIPTION OF THE INVENTION

The above-mentioned objects are complied with by providing, in a first aspect, an integrated apparatus for monitoring separation of solid and liquid phases in a centrifugal by measuring at least one parameter of a filling material inside a centrifugal, the integrated apparatus comprising
at least one light source for illuminating at least part of a surface of the filling material, and
a light detector arrangement being a adapted to receive light reflected from the filling material.

Thus, the present invention relates to an integrated apparatus for analysis and monitoring the content of a centrifugal while the content is positioned inside the centrifugal. In principle the content of the centrifugal and thereby the filling material may be any material which is suitable for being separated into two phases, such as a substantial solid phase and a liquid phase. An example of such a material is a sugar-based material which is separable in a solid crystalline phase and a liquid syrup phase upon proper rotation of the centrifugal. Another term for filling material is massecuite. Massecuite is a widely used and recognised term within the sugar industry. In the following both terms, i.e. filling material and massecuite, will be applied.

The integrated apparatus forms a compact and robust unit which may be positioned either inside or outside the centrifugal during rotation of the centrifugal basket.

The at least one light source may involve a broadband light source, and the light detector arrangement may comprise a plurality of light detectors. By applying a broadband light source and by placing an optical band-pass filter in front of each of the plurality of light detectors a spectral analysis of light reflected from the filling material may be performed in that the optical band-pass filters make the plurality of light detectors sensitive to different wavelengths.

Thus, each light detector may be adapted to measure a predetermined wavelength or a predetermined wavelength range within the wavelength range of the broadband light source. As addressed above this spectral sensitivity may be obtained by positioning an optical band-pass filter or another wavelength separating device, such as a prism or an optical grating, in front of each light detector or array of light detectors so that each light detector is only exposed to the predetermined wavelength or wavelength range.

The integrated apparatus may further comprise a signal processor unit for processing signals from the plurality of light detectors. The signal processing unit may be adapted to signal, via one or more output signals, when the filling material has reached a predetermined colour or colour range, said predetermined colour or colour range being determined from light reflected from the filling material and received by the plurality of light detectors. The one or more output signals being generated by the signal processing unit may be used as one or more control signals for various purposes, such as emptying the centrifugal basket, changing the speed of rotation of the centrifugal basket, including acceleration, pausing and/or deceleration, adding water and/or steam to the filling material, washing the filling material, stop washing the filling material, refilling the centrifugal etc.

In addition, the signal processing unit may be adapted to determine one or more points in time for reaching predetermined colour or colour range of the filling material. Also, the processor may be configured to perform a number of predetermined actions if the predetermined colour or colour range are not reached within a predetermined time. Such actions could for example include that the filling material is sprayed and thereby washed with a liquid, such as water, in order to speed up the process, or delaying the spraying to avoid liquid inside the crystalline layer, or stopping the centrifugal.

The integrated apparatus may further comprise a distance determining arrangement adapted to determine a thickness of a layer of the filling material inside the centrifugal, said thickness determination being based on light reflected from the filling material. The distance determining arrangement may further be adapted to determine distance and thereby thickness variations of the filling material over time. Distance and thereby thickness variations at a given spot may be an indication of swirling of filling material inside the centrifugal. Due to the total and heavy weight of the centrifugal basket and the filling material, swirling of the filling material may be dangerous as it may bring the centrifugal in an unbalanced situation. Instead of determining the thickness of the filling material within the integrated apparatus itself the thickness determination may also be performed in a centrifugal controller using data from the integrated apparatus.

The light source may emit light in the wavelength range 400-700 nm. Such a wavelength range may be provided by for example a Xenon flash lamp and/or a light emitting diode (LED). It should be noted that other types of light sources and wavelength ranges may be applicable as well.

In a second aspect, the present invention relates to a centrifugal assembly comprising a rotatably mounted centrifugal basket and an integrated apparatus according to the first aspect. As previously indicated the integrated apparatus may be positioned either inside or outside the centrifugal basket. The centrifugal may in principle be any type centrifugal, including a batch centrifugal and a continuous centrifugal. The centrifugal assembly may comprise a centrifugal control unit for controlling the centrifugal in response to one or more output signals from the signal processor unit of the integrated apparatus. Thus, the centrifugal may be controlled in response to one or more output signals from the integrated apparatus.

In a third aspect the present invention relates to a method for monitoring and controlling separation of solid and liquid phases in a centrifugal by measuring at least one parameter of a filling material inside a centrifugal basket, the method comprising the steps of
illuminating at least part of a surface of the filling material with at least one light source forming part of an integrated apparatus,
receiving light reflected from the filling material by applying a light detector arrangement forming part of the integrated apparatus,
processing signals from the light detector arrangement, and generating at least one control signal in response to the processed signals from the light detector arrangement, and apply said at least one control signal to control the centrifugal and thereby control the separation of solid and liquid phases.

Similar to the first aspect the integrated apparatus may be positioned either outside or inside the centrifugal basket.

The control scheme of the centrifugal may be applied in a manual or automatic manner, or in a combination thereof.

The processing of the signals from the light detector arrangement may involve that the colour of the filling material is determined from the light reflected from the filling material. The method may further comprise the step of signalling when the filling material either has or has reached a predetermined colour or colour range. Moreover, the method may comprise the step of determining one or more points in time for reaching predetermined colour or colour range of the filling material.

The method according to the third aspect of the present invention thus aims at generating a number of control signals in response to a determined colour of the filling material inside the centrifugal. In general, this or these control signal(s) may be applied to control various parameters of the centrifugal during operation—either via manual control or automatic control. The generated at least one control parameter may depend on whether the centrifugal is a batch centrifugal or a continuous centrifugal.

In case of a batch centrifugal at least one control signal may be applied to control a washing process, such as a water washing process, of the filling material inside the centrifugal basket. For example, the at least one control signal may be applied to control the washing process in an on/off manner in order to avoid that an excess of washing liquid, such as hot water, is applied to the filling material as such excess of washing liquid may result in the generation of undesired waves within the centrifugal basket. At least one control signal may also be applied to control a speed of rotation of the centrifugal basket, including acceleration, pausing and/or deceleration, of the centrifugal basket.

Moreover, the method may further comprise the step of determining a thickness of the filling material inside the centrifugal, said determination being based on light reflected from the filling material, i.e. based on processed signals from the light detector arrangement. The thickness of the filling material may also be determined using other arrangements, such as by using an ultrasound emitter/receiver unit.

The determination of the thickness of the filling material is important in order to ensure that the centrifugal is operated at its maximum capacity. Moreover, the determination of the thickness of the filling material is important in order to avoid overfilling of the centrifugal basket.

In case of a continuous centrifugal at least one control signal may be applied to control an amount of water and/or water steam being added to the filling material before entering the centrifugal basket. Alternatively or in combination therewith at least one control signal may be applied to control an amount of filling material and/or a flow rate of filling material being provided to the centrifugal basket. Also, at least one control signal may be applied to control a washing process, such as a water washing process, of the filling material inside the centrifugal basket.

The above-mentioned control schemes may be applied in a manual or automatic manner, or in a combination thereof.

The at least one light source may involve a broadband light source, and the light detector arrangement may comprise a plurality of light detectors. By applying a broadband light source and by placing an optical band-pass filter in front of each of the plurality of light detectors a spectral analysis of light reflected from the filling material may be performed.

The separation of solid and liquid phases may include the process of separating solid crystalline sugar from liquid syrup upon rotation of the centrifugal. During this separation process the integrated apparatus monitors (in the case of sugar processing) how the massecuite changes colour from brown to white due to the outflow, i.e. run-off, of liquid syrup. For other products the colours may be different and the colour change may be so small that it is hardly visible for human visual observation.

As mentioned above, the centrifugal may in principle be any type centrifugal, including a batch centrifugal and a continuous centrifugal. In case of a batch centrifugal the integrated apparatus is typically configured to monitor colour changes, filling material thicknesses, and potential swirling of the filling material, i.e. up to three physical parameters. In case of a continuous centrifugal the integrated apparatus is typically configured to monitor colour and its variation over short, middle, and long time, i.e. at least one physical parameter. Independent of whether the centrifugal is a batch centrifugal or a continuous centrifugal the determined physical parameter or physical parameters is/are preferably applied to control the centrifugal as discussed above.

BRIEF DESCRIPTION OF THE DRAWINGS

The present invention will now be described in further details with reference to the accompanying figures, wherein.

While the invention is susceptible to various modifications and alternative forms specific embodiments have been shown by way of examples in the drawings and will be described in details herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

In its broadest aspect the present invention relates to an integrated and robust apparatus for monitoring a process in a centrifugal. This process may involve separation of solid and liquid phases, such as separation of solid crystalline sugar and liquid syrup in a centrifugal. The present invention further relates to a method for controlling separation of solid and liquid phases in a centrifugal by measuring at least one parameter of a filling material inside a centrifugal and controlling the centrifugal in response to said measurement.

In general, two types of centrifugals exist—namely batch centrifugals (also called discontinuous centrifugals) and continuous centrifugals. In batch centrifugals separations of solid and liquid phases are performed in batches, whereas in continuous centrifugals separations of solid and liquid phases are performed continuously.

The integrated apparatus and the method of the present invention provide for the following advantages in relation to batch centrifugals:
1) The batch centrifugal can be operated at maximum capacity, i.e. with maximum filling material in the centrifugal basket whereby electrical power and washing liquid may be saved
2) Overfilling of the centrifugal basket can be avoided
3) Washing of the filling material may be started at an optimal point in time whereby washing liquid may be saved and consequential dissolution of good product may be avoided
4) Waves in the centrifugal basket due to over exposure of washing liquid can be avoided—this increases safety during operation of the batch centrifugal
5) Undesired packing of the solid phase—blocking the purging of the liquid phase—may be detected The integrated apparatus and the method of the present invention provide for the following advantages in relation to continuous centrifugals:
1) The speed of rotation of the centrifugal basket may be controlled
2) The timing and the amount of wash water being applied may be controlled
3) The filling rate and/or filling time may be controlled
4) The amount of water and/or water steam added to the filling material may be controlled Moreover, it is advantageous that the integrated apparatus of the present invention is compact and robust, and it may thus be positioned either inside or outside the centrifugal basket despite the harsh interior of the centrifugal. In case of a batch centrifugal, the integrated apparatus of the present invention is adapted to measure at least one physical parameter of a filling material being positioned inside the centrifugal. The physical parameters may include colour determination of the filling material, thickness of the filling material and instability of the filling material or centrifugal basket.

Figure 3:
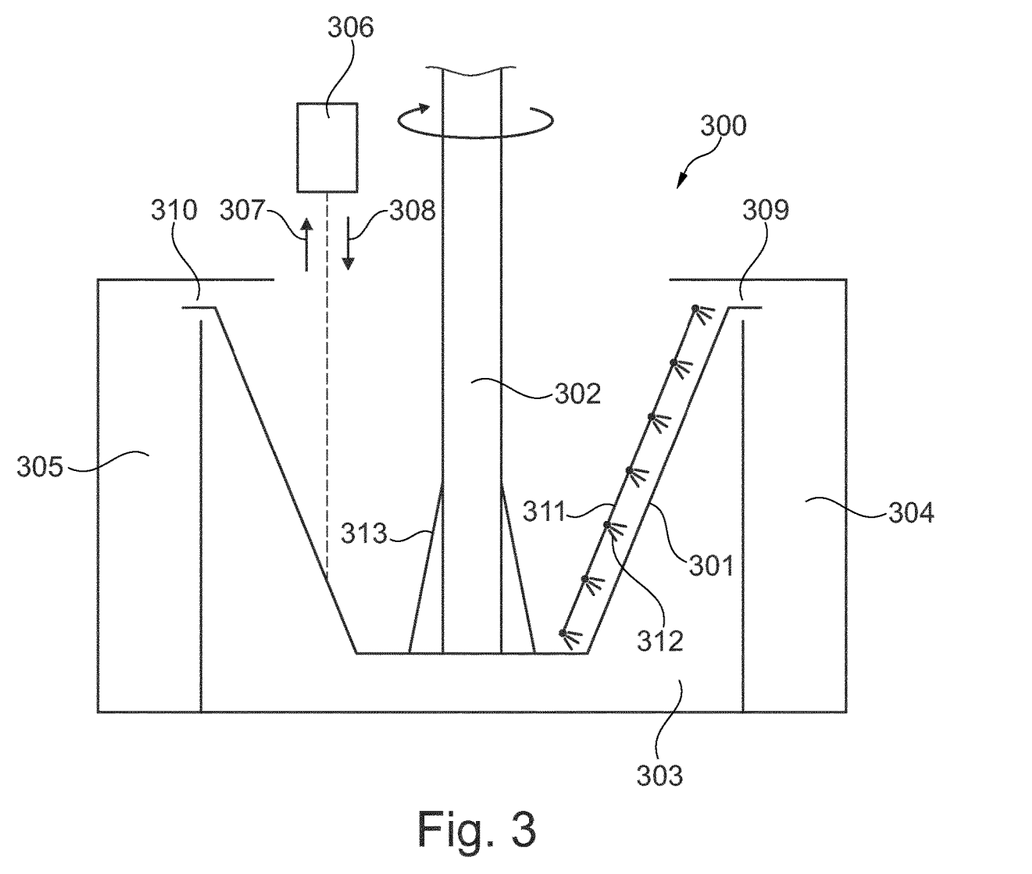
FIG. 3 shows how the integrated apparatus may be positioned outside a continuous centrifugal.

In case of a continuous centrifugal, i.e. a centrifugal with continuous operation, the integrated apparatus is adapted to measure at least the colour of the filing material inside the rotating centrifugal basket, cf FIG. 3.

Returning to the batch centrifugal the at least one physical parameters are determined from light reflected from a surface of the filling material. To comply with this the integrated apparatus of the present invention comprises a suitable light source and a detector arrangement comprising a plurality of light detectors. The light source and the detector arrangement are positioned within the same outer housing and thus form a compact and robust device.

Figure 1:
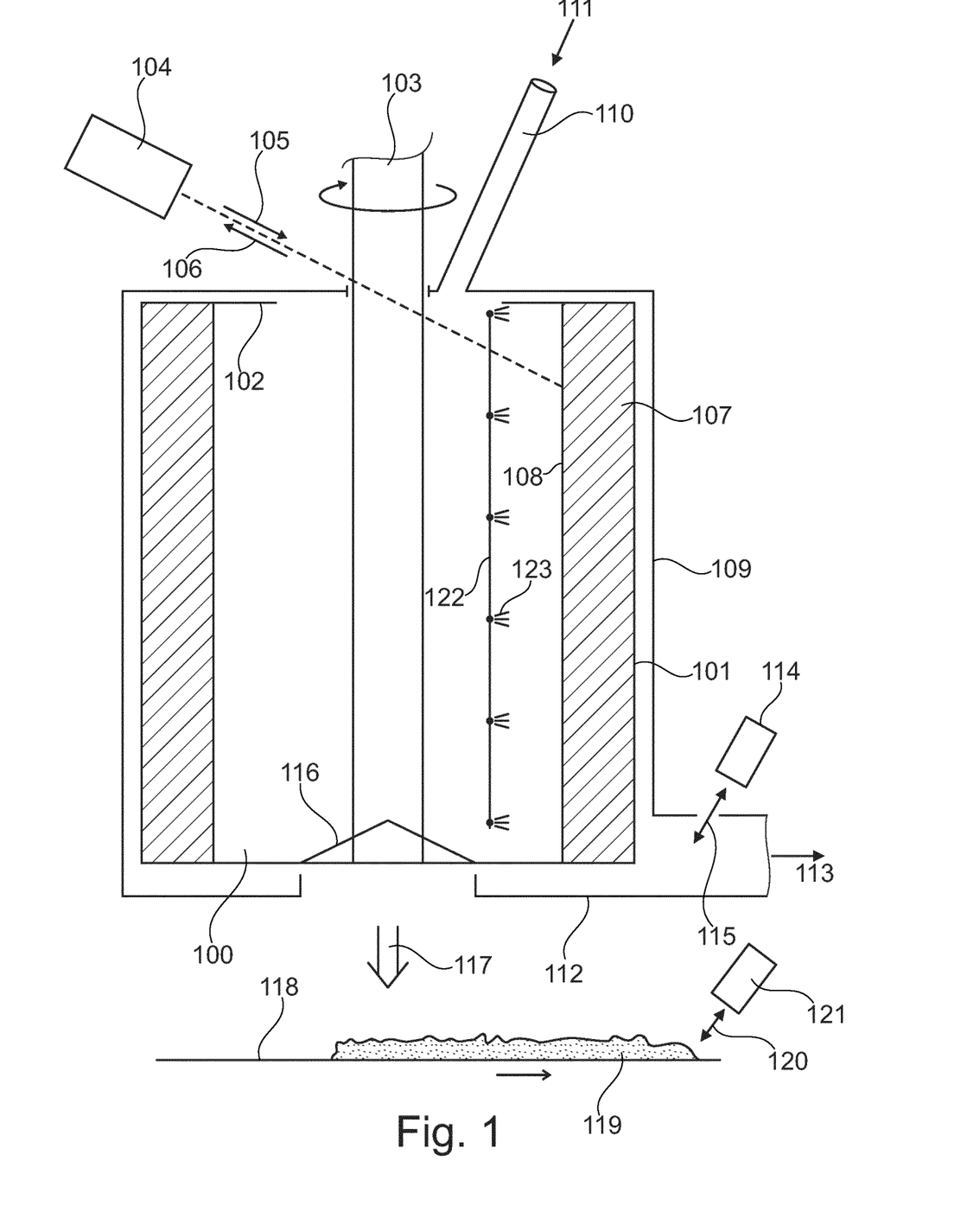
FIG. 1 shows how the integrated apparatus may be positioned outside a batch centrifugal.

Referring now to FIG. 1 a typical setup for use in connection with the present invention is depicted. The setup shown in FIG. 1 comprises a rotatably mounted centrifugal basket 100 in a batch centrifugal being adapted to rotate around axis 103 with a controllable speed of rotation. Upon rotation of the batch centrifugal basket 100 the filling material 107 will be pressed against the vertical sidewall 101 of the centrifugal basket 100. As liquids are allowed to penetrate or escape through pinholes in the vertical sidewall 101 upon rotation of the centrifugal basket 100, separation of solid and liquid phases may be provided. The liquid penetrating or escaping the centrifugal basket 100 is collected by the outer housing 109 and led to the outlet channel 112 where it leaves the centrifugal as indicated by arrow 113. The solid phase is adapted the leave the centrifugal basket via the valve 116 in the bottom of the centrifugal basket as indicated by arrow 117. The solid phase 119 leaves the centrifugal basket on a conveyer arrangement 118 as indicated by the horizontal arrow. The colour of the solid phase leaving the centrifugal may be monitored by an integrated apparatus 121 as indicated by the double arrow 120 with the purpose of monitoring the final crystal quality and controlling the washing time.

During rotation of the centrifugal basket 100, the filling material forms an inner surface 108 onto which light from the integrated apparatus 104 is projected. An edge 102 ensures that the filling material is maintained inside the centrifugal basket.

As indicated by the arrow 105 light emitted from the integrated apparatus is directed toward the surface 108. Similarly, a portion of the light reflected by the surface 108 is detected by the integrated apparatus as indicated by arrow 106.

The centrifugal also contains means 110 for providing filling material (arrow 111) into the centrifugal basket 100, means (outlet channel 112) for emptying the centrifugal basket for liquid run-off and means for removing filling material from the inner sidewalls of the centrifugal basket, i.e. the solid phase left on the inner sidewalls. The latter (removing means) is not shown in FIG. 1. The colour of the liquid run-off phase leaving the centrifugal (arrow 113) may be monitored by another integrated apparatus 114 as indicated by the double arrow 115.

The light source of the integrated apparatus may be a broadband light source typically emitting light in the 400-700 nm range. As previously mentioned the light source may be a Xenon flash lamp and/or a light emitting diode. It should be noted that other types of light sources may be applicable as well.

The light detector arrangement of the integrated apparatus comprises a plurality of light detectors. Each light detector is adapted to detect a predetermined wavelength or a predetermined wavelength range. To provide this spectral sensitivity an optical band-pass filter is positioned in front of each light detector. As the light detector arrangement comprises a plurality of light detectors with different optical band-pass filters associated therewith a spectral sensitivity of the overall light detector arrangement is provided. The spectral sensitivity is used to monitor colour changes of the filling material, for example when a sugar-based filling changes colour from brown to white.

The reflected light from the surface of the filling material is also used to determine the distance to the filling material, i.e. the distance between surfaces 101 and 108. In case the distance to the filling material varies over time this may be determined as well. An example of this may involves a situation where the filling material swirls around inside the centrifugal. A swirling filling material inside the centrifugal basket 100 may bring the centrifugal basket out of balance. As the weight of the filling material and the rotating centrifugal basket of the centrifugal is several tons such an unbalanced situation should be avoided.

The thickness of the filling material is determined via the distance from the integrated apparatus 104 to the surface 108 of the filling material using the following relationship between the amount of reflected light and the distance to the surface 108

$$d = \sqrt{\frac{k}{L_{light}}}$$

where d is the distance, k is a constant and $L_{light}$ is the amount of detected light.

The above expression needs to be corrected in that the incoming light illuminates the surface 108 under an angle w, where w is measured between the incoming light beam and the mathematical normal to the surface 108.

The thickness of the material may thus be determined as $$t = (d_{basket} - d_{surface}) \cos(w)$$

Where $d_{basket}$ is the distance to the basket 101 and $d_{surface}$ is the distance to the surface 108.

The thickness of the filling material near the edge 102 is the critical one and it needs to be determined regularly.

In an alternative approach the thickness of the filling material can be determined experimentally. In this approach only the angle correction needs to be taken into consideration.

A washing arrangement 122 for washing the filling material is also provided. The washing arrangement has a plurality of nozzles 123 so that a homogeneous washing of the filling material 107 across the surface 108 may be provided. As addressed above the integrated apparatus 104 monitors the colour of the filling material 107 whereby also the effect of washing of the filling material. The washing of the surface 108 may be started when the liquid phase of the filling material leaves the surface 108. If an excess of washing liquid is applied to the surface 108, i.e. too much washing liquid is applied too fast to the surface 108, an undesired liquid layer will form on the surface 108. This should be avoided in that such a liquid layer may be generate waves and thereby instability within the centrifugal basket 101 upon rotation thereof. Thus, upon detection of a liquid layer on the surface 108 the washing process should be stopped.

A liquid layer may be formed due to for example a slowly moving liquid phase (towards the centrifugal basket wall) or due to packing of the solid phase near the centrifugal basket wall. Thus, by monitoring the colour of the surface 108 using the integrated apparatus 104 the washing process may be controlled automatically, or alternatively manually.

The colour of the solid phase leaving the centrifugal is monitored by the integrated apparatus 121 as indicated by the double arrow 120. If the colour of the solid phase 119 leaving the centrifugal deviates from a desired colour, the integrated apparatus 121 may provide a control signal to adjust the amount of washing liquid applied to the filling material in the following centrifugal cycle.

The integrated apparatus of the present invention may be implemented and configured in various ways. One example will be discussed in relation to FIG. 2 which depicts a close-up of a possible implementation of the integrated apparatus 200. As seen the integrated apparatus comprises an outer housing 201, a light source 202, a light detector arrangement 203 and respective control units 204 and 205. The light source 202 is adapted to emit light in order to illuminate at least part of the filling material, whereas the light detector arrangement 203 is adapted to detect light reflected from the filling material. The light source 202 includes a light emitting device 206 and eventually some optics 207 to focus the light.

Figure 2:
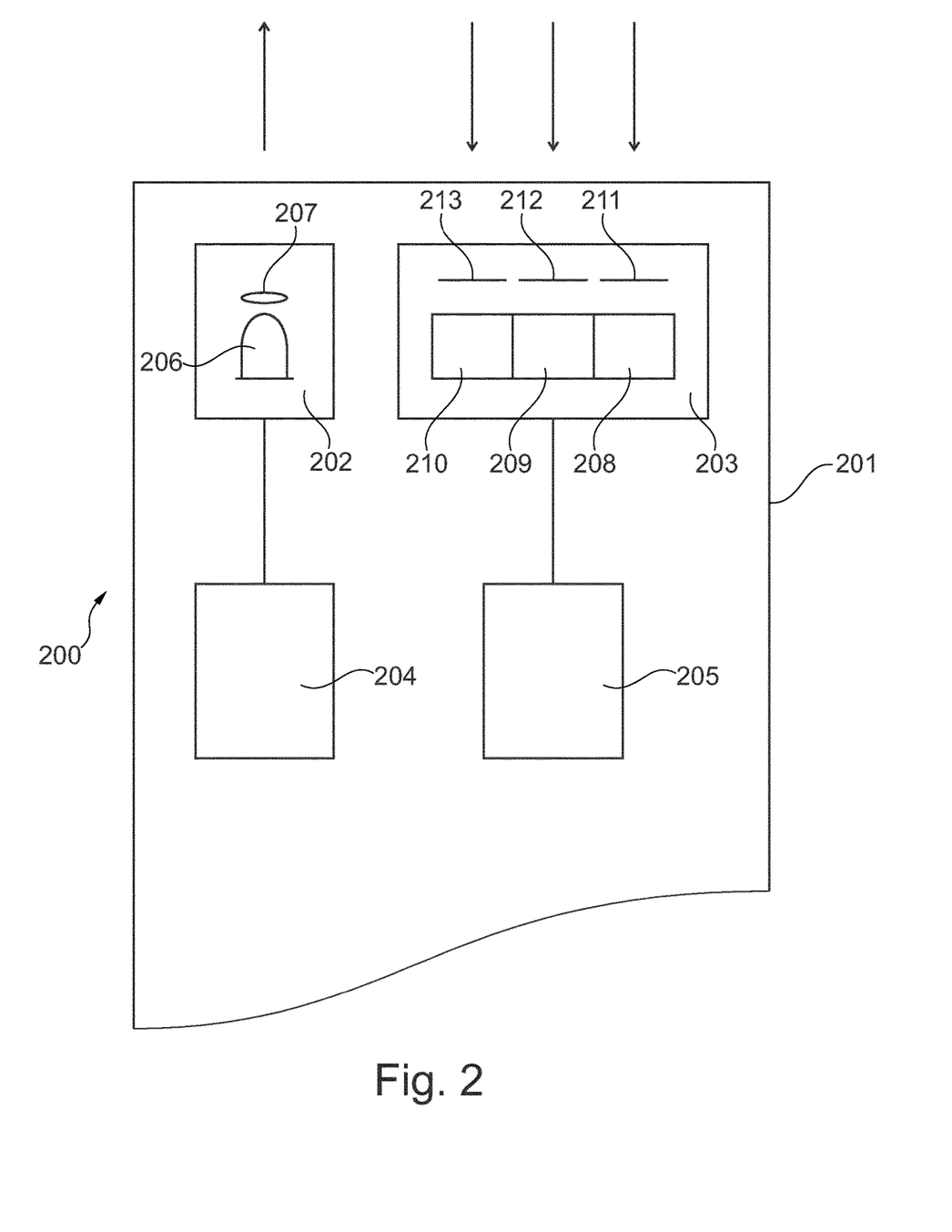
FIG. 2 shows a cross-sectional view of the integrated apparatus.

The light emitting device 206 can be Xenon flash lamp or a LED both emitting light in the 400-700 nm range. It should be noted, however, that other types of light emitting devices may be applicable as well.

The light detecting arrangement 203 comprises a plurality of light detectors 208, 209, 210. It should be noted that the number of light detectors may differ from three. Thus, two or more light detectors may optionally be applied.

Optical band-pass filters 211, 212, 213 are positioned in front of the light detectors 208, 209, 210, respectively. As the band-pass filters 211, 212, 213 are spectrally different the light detectors 208, 209, 210 are configured to detect reflections from the filling material at different wavelengths.

The process of monitoring and optionally controlling separating solid and liquid phases in a centrifugal using the integrated apparatus of the present invention will now be explained with reference to the process of separating solid crystalline sugar from liquid syrup.

Sugar is extracted from cane or beets by milling or with hot water. The resulting juice contains a lot of impurities that will influence the taste and interfere with other ingredients in products, where sugar is used. The final and core cleaning process in factories and refineries is crystallisation, where sugar crystals are grown in a supersaturated syrup (mother liquor). During growth, layer after layer of sugar is added to the crystals, while impurities remain in the mother liquor. The growth is stopped, before the crystals start touching each other. This mix of crystals and mother liquor (named massecuite) is fed into a centrifugal for separation by the centripetal force at high rotational speed.

The mother liquor is sticky syrup. Even after a long centrifugation at high speed a certain amount of syrup will remain on the surface of the sugar crystals. To clean the syrup off the crystals, a washing liquid like hot water is sprayed on the inside of the wall of crystals. This spraying must be kept at an absolute minimum, as excess water will dissolve good sugar. Moreover, excess water may result in waves being generated in the centrifugal basket. Such water waves may induce instability that may cause damage to the centrifugal.

In relation to batch centrifugation the following challenges should often be considered:
1. The massecuite does not have a constant viscosity. The amount flowing through the inlet valve may more than double within minutes. If too much massecuite is entering the centrifugal, it will flow over and enter the conveyors under the centrifugal. After just seconds it will enter the drier, where it will cover all surfaces and stop the process immediately. Cooling down and cleaning the drier takes hours. A real-time measurement of the filling can prevent overfilling. Today, some factories apply (expensive) radar sensors for this task. The integrated apparatus of the present invention can detect the level of filling.
2. The crystals in the massecuite do not have a constant distribution of size. Sometimes the crystals have almost the same size. When they are compressed by the centripetal force in the centrifugal a lot of free space is still present between the crystals to allow the mother liquor to be purged. At other times there is a mix of many sizes of crystals. They prevent the separation by packing together. Unseparable massecuite must be dissolved and recrystallized. This blocks capacity in the factory. At the same time such massecuite poses a serious safety problem. The crystals have a higher density than the mother liquor and are forced out towards the basket, while the liquid mother liquor stays inside the crystals as a liquid layer. Just a tiny disturbance will cause this liquid to travel around inside the basket as waves, generating inequilibrium in the basket and set it in violent vibrations. The integrated apparatus of the present invention can detect mother liquor inside the crystal wall by the colour and can detect vibrations by detecting a rapidly changing distance between the assembly and the massecuite surface inside the centrifugal.
3. The time lapse between the start of acceleration and the moment the mother liquor is no longer visible inside the wall of crystals varies with the viscosity of the massecuite and the crystal distribution as mentioned above. The capacity of the centrifugal is best utilised with an early start of spraying, because the spinning time may be reduced, and because the removal of the syrup early in the acceleration allows a faster acceleration due to the reduced mass. Without real-time information about the disappearance of the mother liquor, safety considerations force the factories to wait with the water spraying until the mother liquor is supposed to have left the sugar wall. The integrated apparatus of the present invention can detect the disappearance of the mother liquor.
4. At bad quality massecuite, the mother liquor may be purging so slowly, that the spray water catches up with it inside the sugar wall. When this happens, the water and mother liquor are mixed and may show up as a coloured layer inside the wall of crystals. Like above, this is again a dangerous situation with free liquid inside the sugar wall. The integrated apparatus of the present invention can detect this and stop the spray water—and eventually the centrifugal.
5. The liquid run-off, for example syrup, in a batch centrifugal is collected by the stationary part of centrifugal surrounding the centrifugal basket. The run-off is typically led to the bottom of the stationary part where it leaves the centrifugal via a pipe. The colour of the liquid run-off may be analysed using an integrated apparatus according to the present invention. In case of the separation of crystalline sugar and liquid syrup the first liquid run-off from the centrifugal basket is brown. When the crystalline sugar inside the centrifugal basket has or is being washed the run-off from the centrifugal basket becomes white. The integrated apparatus of the present invention is capable of distinguishing the colours of the brown and white run-off. Moreover, the integrated apparatus is capable of controlling two valves so that the brown and white run-offs are led to different reservoirs. Thus, by monitoring the run-off the integrated apparatus is capable of ensuring that the two types of run-offs are well separated and led to different reservoirs.

In conclusion, the integrated apparatus and the method according to the present invention is capable of solving a majority of the problems associated with the separation of solid and liquid phases, such as the separation of sugar and syrup in a batch centrifugal.

In relation to a continuous centrifugal the integrated apparatus of the present invention will utilize only a portion of its capacity. As depicted in FIG. 3 a continuous centrifugal 300 typically involves a centrifugal basket 301 taking the shape of a truncated cone. As depicted in FIG. 3 the truncated cone is oriented up-side-down thus having the largest diameter facing upward. Upon rotation of the centrifugal basket around axis 302 the liquid run-off leaves the centrifugal basket through the perforated side-walls hereof, whereas the solid phase leaves the centrifugal basket at the upper edge 309, 310 of the truncated cone. The liquid run-off and the solid phase are therefore well separated and collected in separate reservoirs in that the liquid run-off is collected in reservoir 303, whereas the solid phase is collected in reservoirs 304, 305. A washing arrangement 311 for washing the filling material is also provided. The washing arrangement has a plurality of nozzles 312 so that a homogeneous washing of the filling material may be provided. Finally, a spinning cone 313 is provided as well to accelerate the filling material before it hits the rotating basket.

The integrated apparatus 306 may be arranged either inside or outside the centrifugal basket in order to monitor the colour of the solid phase at a given spot (indicated by the dotted line) inside the centrifugal basket. In FIG. 3 the integrated apparatus is positioned outside the centrifugal basket. Similar to the arrangement involving the batch centrifugal light is both emitted (arrow 308) and received (arrow 307) by the integrated apparatus 306. By monitoring the colour at a given spot variations in the separation of the massecuite may be accounted for in that the filling rate of the continuous flow of filling material into the centrifugal and/or the speed of rotation of the centrifugal basket may be varied as a function of a colour dependent control signal from the integrated apparatus 306. Moreover, the amount of wash water being applied as well as the amount of water and/or water steam added to the filling material before entering the centrifugal basket may be controlled either automatically or manually.

Figure 4:
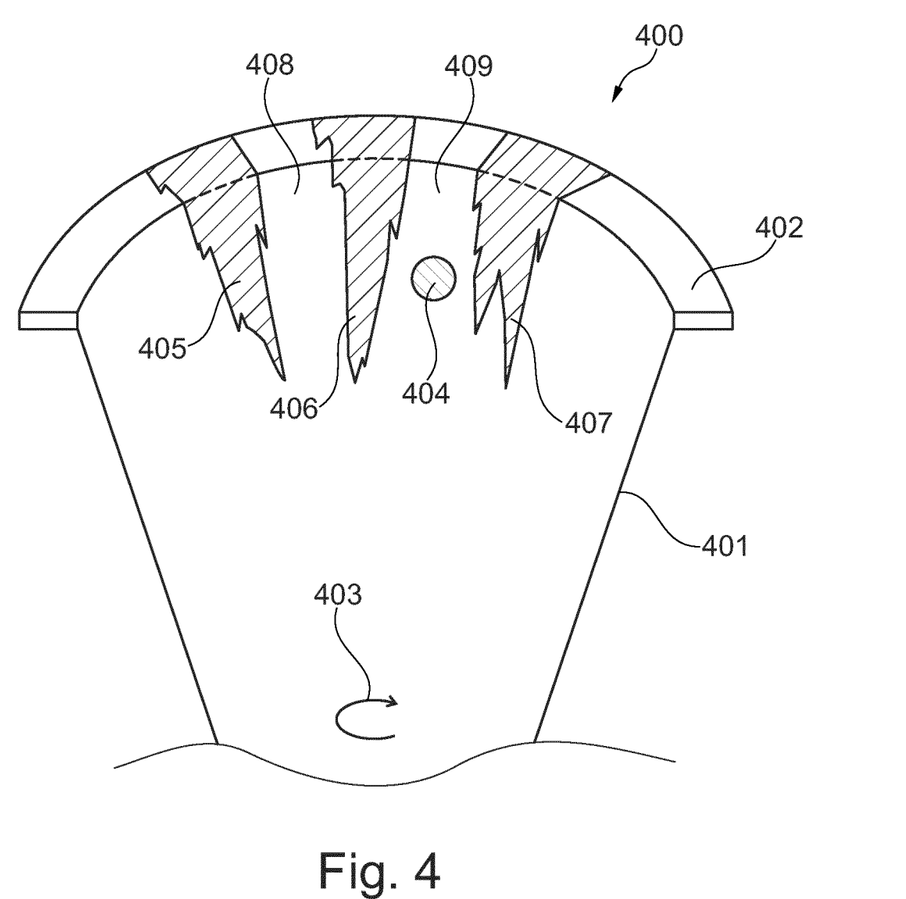
FIG. 4 shows a cross-sectional view of a centrifugal basket of a continuous centrifugal.

FIG. 4 illustrates a cross-sectional view (snapshot) of an upper part 400 of a centrifugal basket 401 of a continuous centrifugal during separation of solid (crystalline sugar) and liquid (liquid syrup) phases. The centrifugal basket 401 takes the form a truncated cone being turned upside down. As seen in FIG. 4 the centrifugal basket 401 is rotatably mounted as indicated by the arrow 403.

The centrifugal basket 401 has an upper edge 402 over which upper edge 402 the solid phase (crystalline sugar) will ideally leave the centrifugal basket, whereas the liquid run-off (liquid syrup) leaves the centrifugal basket through the perforated side-walls.

If the viscosity of the massecuite is inhomogeneous the massecuite is not distributed evenly around the centrifugal basket 401 upon rotation thereof. As a consequence a coloured pattern will appear near the upper edge 402 of the centrifugal basket 401.

The coloured pattern typically includes bright zones 405-407 and dark zones 408-409 being arranged in an alternating manner as illustrated in FIG. 4. In the bright zones 405-407 the liquid syrup has been separated from the crystalline sugar whereas in the dark zones 408-409 some of the liquid syrup is still adhering to the crystalline sugar.

In order to optimize the separation of solid and liquid phases in a centrifugal the massecuite should be as homogeneous as possible, i.e. the colour variations between the bright zones 405-407 and dark zones 408-409 should be reduces to a minimum. Moreover, the colour at the selected height of the centrifugal basket 401, indicated by the spot 404, should be within a predetermined range in order for the separation to be optimized. The integrated apparatus of the present invention will indicate how well the massecuite has been distributed around the centrifugal basket 401 by measuring the colour variation between the bright and dark zones, and indicate how well the liquid syrup has been separated from the crystalline sugar by measuring the colour intensity of the material flowing up the centrifugal basket.

An inhomogeneous viscosity of massecuite may originate from a not properly metered amount of water and/or water steam being added to the filling material being led into the centrifugal basket 401. Thus, by monitoring the colour variation at a given height near the edge 402, cf spot 404, variations in the viscosity of the massecuite may be accounted for by adjusting the amount of water and/or water steam being added to the filling material. Also, the amount of filling material entering the centrifugal basket 401 per time unit as well as the speed of rotation of the centrifugal basket 401 may be adjusted until a homogeneous massecuite at the height of the spot 404 has been reached. As previously addressed the amount of water and/or water steam, the amount of filling material being provided to the centrifugal and/or the speed of rotation of the centrifugal may be controlled manually or automatically in response to the measured colour variations and/or colour intensities.

Figure 5:
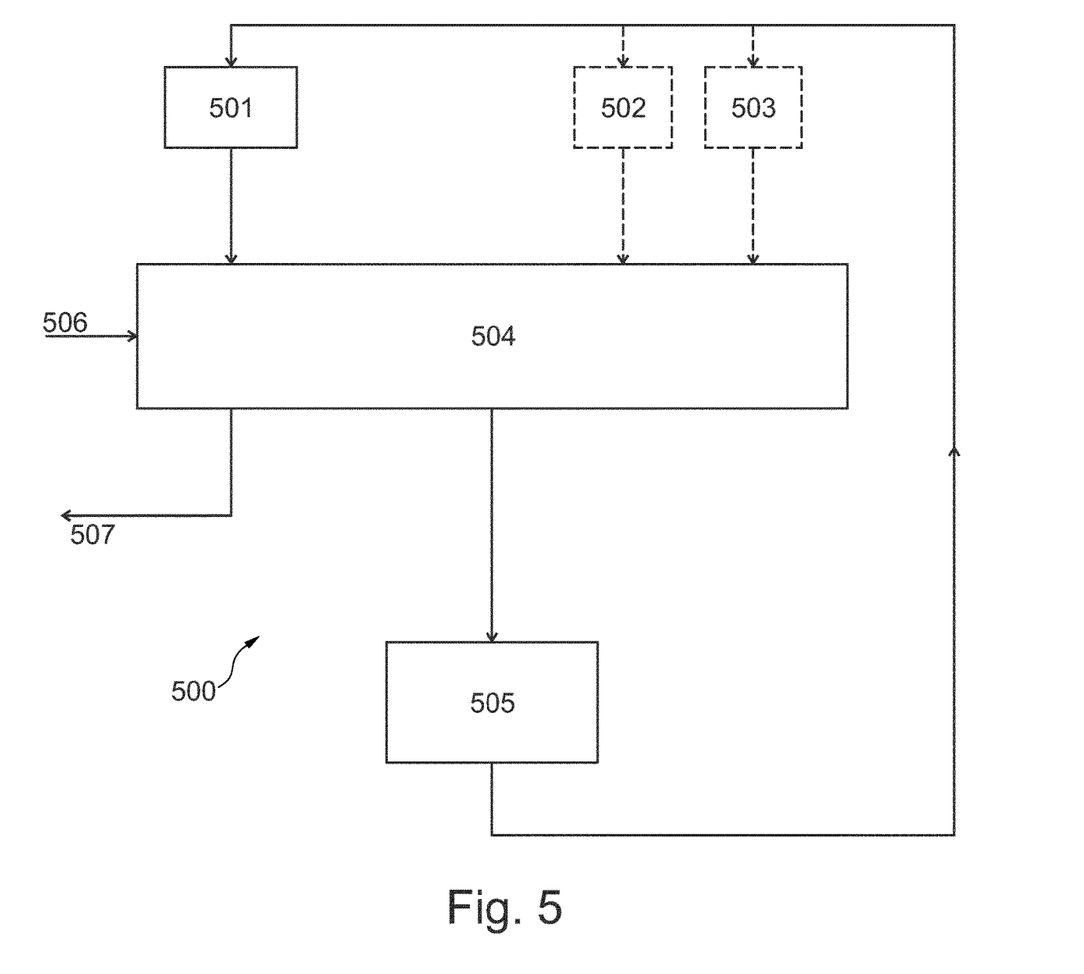
FIG. 5 shows a schematic control system of an embodiment of the present invention.

Referring now to FIG. 5 a schematic of a simple control loop 500 according to an embodiment of the present invention is depicted. In FIG. 5 one or more sensing devices provide data 501-503 about the filling material in the centrifugal basket. As previously discussed such data may relate to the colour of the filling material, the thickness of the filling material, the washing process etc. The one or more sensing devices that generate data 501-503 may correspond to one or more of apparatus' 104, 114, 121 depicted in FIG. 1.

In the next step 504 the data 501-503 from the one or more sensing devices are compared with reference data 506 that may involve a desired colour of the filling material, a desired thickness of the filling material in order to maintain maximum capacity of the centrifugal etc. If the data 501-503 from the one or more sensing devices differs from the reference data 506 by a predetermined amount one or more centrifugal control signals may be adjusted in step 505 in order to optimise the operation of the centrifugal. Alternatively, or in combination therewith, an output signal 507 to be applied in a following centrifugal cycle may be generated.

The one more control signals being adjusted to optimise the operation of the centrifugal may, as previously discussed, involve a variety of centrifugal control signals, including
1) at least one control signal to control a washing process of the filling material inside the centrifugal basket
2) at least one control signal to control the washing process in an on/off manner in order to avoid that an excess of washing liquid is applied to the filling material
3) at least one control signal to control a speed of rotation of the centrifugal basket, including acceleration, pausing and/or deceleration, of the centrifugal basket
4) at least one control signal to control an amount of water and/or water steam being added to the filling material before entering the centrifugal basket
5) at least one control signal to control an amount of filling material and/or a flow rate of filling material being provided to the centrifugal basket In response the adjusted control signals a new set of data 501-503 about the filling material may be generated, and subsequently a new comparison between actual data 501-503 and reference data 506 may be performed.

The invention claimed is:

1. A centrifugal assembly comprising:
   a centrifuge; and
   an integrated apparatus for monitoring separation of solid phase and liquid phase in the centrifuge by measuring at least one parameter of a filling material inside the centrifuge,
   wherein the integrated apparatus is positioned outside a centrifugal basket of the centrifuge, and
   wherein the integrated apparatus includes
      at least one broadband light source for illuminating at least part of a surface of the filling material, and
      a light detector arrangement comprising a plurality of light detectors being adapted to receive light reflected from the filling material.

2. A centrifugal assembly according to claim 1, further comprising a signal processor unit for processing signals from the light detector arrangement, wherein the signal processor unit is adapted to generate one or more output signals in response to the processed signals from the light detector arrangement.

3. A centrifugal assembly according to claim 2, wherein the signal processing unit is adapted to signal when the filling material has or has reached a predetermined colour or colour range, said predetermined colour or colour range being determined from light reflected from the filling material and received by the light detector arrangement.

4. A centrifugal assembly according to claim 3, wherein the signal processing unit is adapted to determine one or more points in time for reaching predetermined colour(s) or colour range(s) of the filling material.

5. A centrifugal assembly according to claim 1, wherein the at least one light source emits light in the wavelength range 400-700 nm.

6. A centrifugal assembly according to claim 5, wherein the light source comprises a Xenon flash lamp and/or a light emitting diode.

7. A centrifugal assembly according to claim 1, wherein the centrifuge is a batch centrifuge or a continuous centrifuge.

8. A centrifugal assembly according to claim 1, further comprising a centrifugal control unit for controlling the centrifuge in response to one or more output signals from the signal processor unit of the integrated apparatus.

9. A method for monitoring and controlling separation of solid phase and liquid phase in a centrifuge by measuring at least one parameter of a filling material inside a centrifugal basket, the method comprising the steps of:
- illuminating at least part of a surface of the filling material with at least one broadband light source forming part of an integrated apparatus, the integrated apparatus being positioned outside the centrifugal basket of the centrifuge,
- receiving light reflected from the filling material by applying a light detector arrangement comprising a plurality of light detectors, the light detector arrangement forming part of the integrated apparatus,
- processing signals from the light detector arrangement,
- generating at least one control signal in response to the processed signals from the light detector arrangement, and
- applying said at least one control signal to control the centrifuge and to control the separation of solid phase and liquid phase.

10. A method according to claim 9, further comprising the step of signalling when the filling material has or has reached a predetermined colour or colour range.

11. A method according to claim 10, further comprising the step of determining one or more points in time for reaching predetermined colour or colour range.

12. A method according to claim 9, wherein the centrifuge is a batch centrifuge and wherein the method further comprises the step of determining a thickness of a layer of the filling material inside the batch centrifuge, said determination being based on processed signals from the light detector arrangement or based on signals from an ultrasound receiver arrangement.

13. A method according to claim 12, wherein at least one control signal is applied to control an amount of filling material being provided to the batch centrifuge such that overfilling of the centrifugal basket is avoided.

14. A method according to claim 12, wherein at least one control signal is applied to control a washing process of the filling material inside the centrifugal basket.

15. A method according to claim 14, wherein the at least one control signal is applied to on/off control of the washing process such that an excess of washing liquid to the filling material is avoided.

16. A method according to claim 12, wherein at least one control signal is applied to control a speed of rotation of the centrifugal basket, including acceleration, pausing and/or deceleration.

17. A method according to claim 9, wherein the centrifuge is a continuous centrifuge, and wherein at least one control signal is applied to control an amount of filling material being provided to the centrifuge.

18. A method according to claim 17, wherein at least one control signal is applied to control an amount of water and/or water steam being added to the filling material being provided to the centrifuge.

19. A method according to claim 17, wherein at least one control signal is applied to control a flow-rate of filling material being provided to the centrifuge.

20. A method according to claim 17, wherein at least one control signal is applied to control a washing process of the filling material inside the centrifuge.

* * * * *